United States Patent
Anstine et al.

(10) Patent No.: US 9,631,492 B2
(45) Date of Patent: Apr. 25, 2017

(54) NON-CAKING ROCK DUST FOR USE IN UNDERGROUND COAL MINES

(71) Applicant: Imerys Pigments, Inc., Roswell, GA (US)

(72) Inventors: David Anstine, Canton, GA (US); Dickey Shurling, Jr., Sandersville, GA (US)

(73) Assignee: Imerys USA, Inc., Roswell, GA (US)

( * ) Notice: Subject to any disclaimer, the term of this patent is extended or adjusted under 35 U.S.C. 154(b) by 225 days.

(21) Appl. No.: 14/281,610

(22) Filed: May 19, 2014

(65) Prior Publication Data
US 2015/0008369 A1  Jan. 8, 2015

Related U.S. Application Data

(60) Provisional application No. 61/842,156, filed on Jul. 2, 2013.

(51) Int. Cl.
| | |
|---|---|
| *E21F 5/12* | (2006.01) |
| *C09K 3/18* | (2006.01) |
| *C09K 3/22* | (2006.01) |
| *C01F 11/18* | (2006.01) |
| *C09C 1/02* | (2006.01) |

(52) U.S. Cl.
CPC .............. *E21F 5/12* (2013.01); *C01F 11/185* (2013.01); *C09C 1/024* (2013.01); *C09K 3/18* (2013.01); *C09K 3/22* (2013.01); *C01P 2004/61* (2013.01); *C01P 2004/62* (2013.01); *C01P 2006/12* (2013.01); *C01P 2006/60* (2013.01)

(58) Field of Classification Search
None
See application file for complete search history.

(56) References Cited

U.S. PATENT DOCUMENTS

| | | | | |
|---|---|---|---|---|
| 3,415,774 | A | * | 12/1968 | Hood .................... C04B 24/302 524/650 |
| 3,595,317 | A | | 7/1971 | Bell |
| 4,019,918 | A | * | 4/1977 | Wills, Jr. ................ C04B 28/04 106/725 |
| 4,190,456 | A | | 2/1980 | Absolon et al. |
| 4,805,702 | A | | 2/1989 | White |
| 5,238,193 | A | | 8/1993 | Pearce |
| 6,634,224 | B1 | | 10/2003 | Schöb et al. |
| 8,580,141 | B2 | * | 11/2013 | Khanna .................. C09C 1/021 106/464 |
| 2004/0195545 | A1 | | 10/2004 | Gay et al. |
| 2007/0167531 | A1 | | 7/2007 | Preston et al. |
| 2010/0193982 | A1 | * | 8/2010 | Genolet .................. C04B 7/527 264/36.2 |
| 2012/0111583 | A1 | * | 5/2012 | Brown ...................... E21F 5/12 169/45 |
| 2012/0181051 | A1 | | 7/2012 | Masloff et al. |
| 2014/0193642 | A1 | * | 7/2014 | Anstine .................. C09K 15/06 428/402 |
| 2015/0008369 | A1 | * | 1/2015 | Anstine ...................... E21F 5/12 252/383 |
| 2015/0037496 | A1 | * | 2/2015 | Wicks ....................... E21F 5/12 427/180 |

OTHER PUBLICATIONS

International Search Report and Written Opinion for related International Application No. PCT/US2014/038633, dated Sep. 30, 2014.

* cited by examiner

*Primary Examiner* — Joseph D Anthony
(74) *Attorney, Agent, or Firm* — Finnegan, Henderson, Farabow, Garrett & Dunner LLP

(57) ABSTRACT

A heterogeneous composition for use as rock dust is disclosed. The heterogeneous composition includes a fine, wet ground inorganic particulate material treated with at least one fatty acid, a salt thereof, or an ester thereof, and a coarse, untreated, dry ground inorganic particulate material. Also disclosed is a heterogeneous composition including coal dust and mine rock dust including a fine, wet ground inorganic particulate material treated with at least one fatty acid, a salt thereof, or an ester thereof, and a coarse, untreated, dry ground inorganic particulate material. The amount of mine rock dust may be sufficient to render the coal dust explosively inert. The fine, treated, wet ground inorganic particulate material may be calcium carbonate. The coarse, untreated inorganic particulate material may be calcium carbonate. The fatty acid may be stearic acid.

19 Claims, No Drawings

NON-CAKING ROCK DUST FOR USE IN UNDERGROUND COAL MINES

CROSS-REFERENCE TO RELATED APPLICATIONS

This application claims the benefit of priority of U.S. Provisional Application No. 61/842,156, filed Jul. 2, 2013, the disclosure of which is incorporated herein by reference.

GOVERNMENT RIGHTS

This invention was made with Government support under Contract No. 200-2012-52496 awarded by The Centers for Disease Control and Prevention. The government has certain rights in the invention.

FIELD OF DISCLOSURE

Disclosed herein are heterogeneous compositions for use as rock dust to abate explosions in mines, such as coal mines.

BACKGROUND OF THE DISCLOSURE

For many years limestone-based rock dust has been the mine rock dust of choice for explosion abatement. Typically limestone mine rock dusts are readily available throughout North America and prevent the propagation of an explosion when applied in a proper manner to all mine surfaces and used in the correct proportion to the coal dust generated during the mining process.

However, in 2011, it was reported by the National Institute of Occupation Safety and Health (NIOSH) that examinations of the tendency of rock dust samples to cake when wetted and subsequently dried revealed that the examined samples formed cakes and were not easily dispersed with the subjective requirement of a "light blast of air." The rock dust samples NIOSH analyzed contained very fine (e.g., less than 10 microns) particles. Fine particles enhance the caking potential of rock dust when wetted.

Therefore, it would be desirable to provide an economically-viable modified limestone-based rock dust that will be capable of passing the caking evaluation tests established by NIOSH and effectively inerting coal dust.

DESCRIPTION OF EXEMPLARY EMBODIMENTS

According to some embodiments, an anti-caking mine rock dust may include heterogeneous composition including a fine, wet ground inorganic particulate material (e.g., a mineral) treated with at least one fatty acid, a salt thereof, or an ester thereof, and a coarse, untreated, dry ground inorganic particulate material.

According to some embodiments, a heterogeneous composition includes coal dust and mine rock dust including a fine, wet ground inorganic particulate material treated with at least one fatty acid, a salt thereof, or an ester thereof, and a coarse, untreated, dry ground inorganic particulate material. The amount of mine rock dust may be sufficient to render the coal dust explosively inert.

As used herein, a "heterogeneous composition" refers to a blended composition including a fine, wet ground inorganic particulate material and a coarse, dry ground inorganic particulate material. A "heterogeneous ground calcium carbonate" refers to a heterogeneous composition including a fine, wet ground calcium carbonate material, and a coarse, dry ground calcium carbonate material. The term "coarse" refers to a component of a heterogeneous composition having a relatively larger mean particle size than the corresponding "fine" component. The term "treated" refers to a treatment of the inorganic particulate material with at least one fatty acid, a salt thereof, or an ester thereof. The term "untreated" refers to an inorganic particulate material that is not "treated" as described above.

In particular embodiments, the inorganic particulate materials may include calcium carbonate, such as, for example, marble or limestone (e.g., ground calcite or ground dolomite). Hereafter, certain embodiments of the invention may tend to be discussed in terms of calcium carbonate, and in relation to aspects where the calcium carbonate is processed and/or treated. The invention should not be construed as being limited to such embodiments. For example, calcium carbonate may be replaced, either in whole or in part, with, for example, talc.

In certain embodiments, the at least one fatty acid, salt thereof, or ester thereof may be one or more fatty acids, salts thereof, or esters thereof with a chain length of C16 or greater. According to some embodiments, the fatty acid may be stearic acid.

In certain embodiments, the fine, wet ground inorganic particulate material has a Hegman of about 5.5 or less, as measured by ASTM D1210.

In some embodiments, the fine, wet ground inorganic particulate material has a brightness of 95 or less, as measured using Hunter Colorimeter Models D-25A-9 or DP 9000.

Surprisingly, in certain embodiments where the heterogeneous composition comprises relatively small amounts of the fine, wet ground treated inorganic particulate material in comparison to the coarse, dry ground untreated inorganic material (i.e., at weight ratios ranging from about 5:95 to about 30:70) it has been found that the heterogeneous composition has a relatively high contact angle (e.g., a contact angle response greater than would be expected under the rule of mixtures). In some embodiments, the heterogeneous composition has a range of contact angles from 10 to 150 degrees. According to some embodiments, the heterogeneous composition has a range of contact angles from 25 to 125 degrees, or from 50 to 100 degrees.

In some embodiments, the fine, wet ground inorganic particulate material may have a BET surface area of at least about 0.3 square meters/gram. For example, the fine, wet ground inorganic particulate material may have a BET surface area of at least about 0.4 square meters/gram, at least about 0.5 square meters/gram, or at least about 0.6 square meters/gram.

In particular embodiments, the coarse, untreated, dry ground inorganic particulate material of the anti-caking mine rock dust may include a blend of, for example, talc, limestone (e.g., ground calcium carbonate (GCC), ground calcite, ground dolomite), chalk, marble, and fine, treated, wet ground mineral such as talc, limestone (e.g., GCC, ground calcite, ground dolomite). In other embodiments, the coarse, untreated inorganic particulate material may include gypsum, diatomaceous earth, perlite, hydrous or calcined kaolin, attapulgite, bentonite, montmorillonite, and other natural or synthetic clays. In some embodiments, blending a fine, treated, wet ground limestone with a coarse, untreated, dry ground limestone results in a mine rock dust which exhibits some hydrophobic properties and less caking when put in contact with water versus untreated limestone alone. The effectiveness of certain embodiments of the mine rock dust in inerting coal dust may be shown by explosibility tests, for instance, a 20-L explosibility test or ASTM E1515.

Without being bound by a particular theory, it is believed that the ratio of the fine, treated, wet ground inorganic particulate material to coarse, untreated, dry ground inorganic particulate material may be proportioned to vary the amount of unreacted stearic acid in the blends. In certain embodiments, stearic acid-treated wet ground calcium carbonate may be used to provide a hydrophobic property to the rock dust. Without being bound by a particular theory, addition of stearic acid may result in minimal "free acid" after treatment. The reaction of stearic acid with the limestone surface may create calcium or magnesium stearate. The melting point of stearic acid is approximately 157° F. (69.4° C.), and the melting point of calcium stearate is approximately 311° F. (155° C.).

According to some embodiments, wet ground calcium carbonate is combined (e.g., blended) at room temperature with stearic acid (or salts thereof, esters thereof, or mixtures thereof) and water in an amount greater than about 0.1% by weight relative to the total weight of the mixture (e.g., in the form of a cake-mix). For example, according to some embodiments, the mixture may be blended at a temperature sufficient for at least a portion of the stearic acid to react (e.g., sufficient for a majority of the stearic acid to react, for example, with at least a portion of the calcium carbonate). For instance, the mixture may be blended at a temperature sufficient such that at least a portion of the stearic acid may coat at least a portion of the calcium carbonate (e.g., the surface of the calcium carbonate).

In some embodiments, the mixture may be blended at a temperature high enough to melt the stearic acid. For example, the mixture may be blended at a temperature ranging from about 149° F. (65° C.) to about 392° F. (200° C.). In other embodiments, the mixture may be blended at a temperature ranging from about 149° F. (65° C.) to about 302° F. (150° C.), for example, at about 248° F. (120° C.). In further embodiments, the mixture may be blended at a temperature ranging from about 149° F. (65° C.) to about 212° F. (100° C.). In still other embodiments, the mixture may be blended at a temperature ranging from about 149° F. (65° C.) to about 194° F. (90° C.). In further embodiments, the mixture may be blended at a temperature ranging from about 158° F. (70° C.) to about 194° F. (90° C.).

In certain embodiments, the amount of stearic acid may be combined with calcium carbonate below, at, or in excess of, a monolayer concentration. As used herein, "monolayer concentration" is intended to mean an amount sufficient to form a monolayer on the surface of the calcium carbonate particles. Without being bound by a particular theory, such values will be readily calculable to one skilled in the art based on, for example, the surface area of the calcium carbonate particles.

In some embodiments, stearic acid may be added to calcium carbonate in an amount greater than or equal to about one times the monolayer concentration. In other embodiments, stearic acid may be added in an amount in excess of about one times the monolayer concentration, for example, two times to six times the monolayer concentration.

Also, the median particle sizes of the coarse, untreated, dry ground inorganic particulate mine rock dust may be chosen based on their potential to particle pack with the median particle size of the specific fine, treated, wet ground mine rock dust to be used in that blend. The advantage of blending the smaller particles with the larger particles is that the voids between the larger particles that would wick moisture into the blend are reduced or avoided. In certain embodiments, particle packing practice may be used to inhibit the wicking action of surface water through the powder.

In certain embodiments, the calcium carbonate may be characterized by a mean particle size ($d_{50}$) value, defined as the size at which 50 percent of the calcium carbonate particle concentration includes particles having a diameter less than or equal to the stated $d_{50}$ value. Particle size measurements, such as $d_{50}$, may be carried out by any means now or hereafter known to those having ordinary skill in the art.

The particle size and other particle size properties of the fine, treated inorganic particulate material may be determined by a Microtrac Model X100 Particle Size Analyzer, as supplied by Microtrac. The Microtrac analysis determines particle size based on the number distribution of particles using a laser light scattering technique.

Particle sizes, and other particle size properties, of the coarse, untreated inorganic particulate material referred to in the present disclosure, may be measured using a SEDIGRAPH 5100 instrument, as supplied by Micromeritics Corporation, where the size of a given particle is expressed in terms of the diameter of a sphere of equivalent diameter, which sediments through the suspension, i.e., an equivalent spherical diameter or esd.

In some embodiments, the particle size as determined by SEDIGRAPH 5100 may not be the same as that determined by a Microtrac Model X100 Particle Size Analyzer. The difference may be due to the different methods used by each instrument to determine the particle size. The SEDIGRAPH 5100 measures the sedimentation of particles over time, whereas the Microtrac Model X100 Particle Size Analyzer analyzes a laser light scattering pattern using a specific algorithm.

According to some embodiments, the amount of free stearic acid associated with the stearic acid-treated calcium carbonate composition may be less than about 20% relative to the monolayer concentration. According to other embodiments, the amount of free stearic acid associated with the stearic acid-treated heterogeneous calcium carbonate composition may be less than about 15% free stearic acid. According to further embodiments, the amount of free stearic acid associated with the stearic acid-treated heterogeneous calcium carbonate composition may be less than about 10% free stearic acid. According to still other embodiments, the amount of free stearic acid associated with the stearic acid-treated heterogeneous calcium carbonate composition may be less than about 7% free stearic acid. According to still further embodiments, the amount of free stearic acid associated with the stearic acid-treated heterogeneous calcium carbonate composition may be less than about 6% free stearic acid. According to other embodiments, the amount of free stearic acid associated with the stearic acid-treated heterogeneous calcium carbonate composition may be less than about 5% free stearic acid. According to further embodiments, the amount of free stearic acid associated with the stearic acid-treated heterogeneous calcium carbonate composition may be less than about 4% free stearic acid, less than about 3% free stearic acid, less than about 2% free stearic acid, or less than about 1% free stearic acid. In still further embodiments, no free stearic acid may be associated with the stearic acid-treated heterogeneous calcium carbonate composition. As used herein, "no free stearic acid" is intended to mean no stearic acid detectable by the ToF-SIMS, TGA, and/or DSC techniques described herein.

According to some embodiments, the fine, treated, wet ground inorganic particulate material has a relatively smaller $d_{50}$ value than the coarse, untreated, dry ground inorganic particulate material. For example, the $d_{50}$ of the coarse, untreated, dry ground inorganic particulate material may be from about 50 times to about 2 times larger than the $d_{50}$ of the fine, treated, wet ground inorganic particulate material. In other embodiments, the $d_{50}$ of the coarse, untreated, dry ground inorganic particulate material may be from about 35 times to about 2 times larger than the $d_{50}$ of the fine, treated, wet ground inorganic particulate material.

An exemplary anti-caking mine rock dust is now described. The mine rock dust may be such that a minimum of 70% of the particles passes through a 200 mesh. In some embodiments, the $d_{50}$ of the fine, treated, wet ground inorganic particulate material ranges from about 0.5 to about 75 microns; no more than about 0.4 wt % stearic acid is present (without being bound by a particular theory, too much stearic acid may affect whether the mine rock dust will adhere property to the mine walls and ceilings); and the ratio by weight of fine treated portion to coarse untreated portion ranges from about 5:95 to about 30:70, or from about 10:90 to about 20:80, or less than about 50:50. The fine portion may be treated with stearic acid, silicone oil, or silane, although silane may not be used to treat limestone. For the stearic acid treatment, it is preferred to have reacted stearate on the mineral, as it has a higher melting point (311° F.) relative to unreacted (free) stearic acid (157° F.). The $d_{50}$ of the coarse, untreated, dry ground inorganic particulate material may range from about 3 to about 75 microns.

In certain embodiments, the treatment level ranges from 0.1 wt % to 2.5 wt % of the treated, fine, wet ground inorganic particulate material. For instance, the fatty acid, salt thereof, or ester thereof may be present in an amount of not more than 0.2 wt %, not more than 0.3 wt %, not more than 0.4 wt %, not more than 0.5 wt %, not more than 0.6 wt %, not more than 0.7 wt %, not more than 0.8 wt %, not more than 0.9 wt %, not more than 1.0 wt %, not more than 1.1 wt %, not more than 1.2 wt %, not more than 1.25 wt %, not more than 1.3 wt %, not more than 1.4 wt %, not more than 1.5 wt %, not more than 1.6 wt %, not more than 1.7 wt %, not more than 1.8 wt %, not more than 1.9 wt %, not more than 2.0 wt %, not more than 2.1 wt %, not more than 2.2 wt %, not more than 2.3 wt %, not more than 2.4 wt %, or not more than 2.5 wt % based on the weight of the treated, fine, wet ground inorganic particulate material.

In certain embodiments, the fine, treated, wet ground inorganic particulate material $d_{50}$ ranges from 1 to 15 microns. In other embodiments, the fine, treated, wet ground inorganic particulate material $d_{50}$ ranges from 0.5 to 75 microns, from 1 to 60 microns, from 1 to 50 microns, or from 1 to 30 microns.

In other embodiments, the coarse, untreated, dry ground portion $d_{50}$ may range from 3 to 75 microns, for example, from 10 to 75 microns, from 12 to 75 microns, from 20 to 75 microns, from 25 to 75 microns, from 30 to 75 microns, from 5 to 50 microns, or from 10 to 50 microns.

In certain embodiments, the ratio by weight of fine, treated, wet ground inorganic particulate material to coarse, untreated, dry ground inorganic particulate material ranges from about 5:95 to about 30:70, or from about 10:90 to about 20:80, or less than about 50:50.

Three examples may be prepared according to the exemplary method outlined below:

1. 80% by weight of coarse (12-18 micron) dry ground untreated limestone combined with 20% by weight of fine 3 micron median stearate-treated wet ground limestone blend;
2. 85% by weight of coarse (12-18 micron) dry ground untreated limestone combined with 15% by weight of fine 3 micron median stearate-treated wet ground limestone blend; and
3. 90% by weight of coarse (12-18 micron) dry ground untreated limestone combined with 10% by weight of fine 3 micron median stearate-treated wet ground limestone blend.
4. 80% by weight of coarse (30-50 micron) dry ground untreated limestone combined with 20% by weight of fine 1.5 micron median stearate-treated wet ground limestone blend.

In some embodiments, the ground calcium carbonate is prepared by attrition grinding. "Attrition grinding" as used herein refers to a process of wearing down particle surfaces resulting from grinding and shearing stress between the moving grinding particles. Attrition can be accomplished by rubbing particles together under pressure, such as by a gas flow.

In some embodiments, the attrition grinding is performed autogenously, where the calcium carbonate particles are ground only by other calcium carbonate particles.

In another embodiment, the calcium carbonate is ground by the addition of a grinding media other than calcium carbonate. Such additional grinding media can include ceramic particles (e.g., silica, alumina, zirconia, and aluminum silicate), plastic particles, or rubber particles.

In some embodiments, the calcium carbonate is ground in a mill. Exemplary mills include those described in U.S. Pat. Nos. 5,238,193 and 6,634,224, the disclosures of which are incorporated herein by reference. As described in these patents, the mill may comprise a grinding chamber, a conduit for introducing the calcium carbonate into the grinding chamber, and an impeller that rotates in the grinding chamber thereby agitating the calcium carbonate.

In some embodiments, the coarse, untreated calcium carbonate is dry ground, where the atmosphere in the mill is ambient air. In some embodiments, the fine treated calcium carbonate may be wet ground.

In some embodiments, the rock dust having a heterogeneous composition may have a range of contact angles from 10 to 150 degrees, from 25 to 125 degrees, or from 50 to 100 degrees, as measured by a test according to ASTM D7334-08. For example, a fine, stearate-treated, wet ground calcium carbonate may be blended with a coarse, untreated, dry ground calcium carbonate in a ratio by weight (treated:untreated) of about 5:95 to about 30:70, or from about 10:90 to about 20:80, or less than about 50:50. The fine, treated, wet ground calcium carbonate may be treated with 1.15 wt % of stearate and may have a $d_{50}$ value of 3.3 microns, as measured by Microtrac laser light diffraction. The coarse, untreated, dry ground calcium carbonate may have a $d_{50}$ value of 22.5 microns, as measured by a SEDIGRAPH 5100. The contact angle of the blended, heterogeneous composition may be measured according to ASTM D7334-08. The heterogeneous composition has a contact angle of 93 degrees at 35% relative humidity, and 95.5 degrees at 98% relative humidity.

In some embodiments, a feed calcium carbonate (prior to milling) may include calcium carbonate sources chosen from calcite, limestone, chalk, marble, dolomite, etc. Ground calcium carbonate particles may be prepared by any known method, such as by conventional grinding techniques discussed above and optionally coupled with classifying techniques, e.g., jaw crushing followed by roller milling or hammer milling and air classifying or mechanical classifying.

In some embodiments, the ground calcium carbonate is further subjected to an air sifter or hydrocyclone. The air sifter or hydrocyclone can function to classify the ground calcium carbonate and remove a portion of residual particles greater than 20 microns. According to some embodiments, the classification can be used to remove residual particles greater than 10 microns, greater than 30 microns, greater than 40 microns, greater than 50 microns, or greater than 60 microns. According to some embodiments, the ground calcium carbonate may be classified using a centrifuge, hydraulic classifier, or elutriator.

In some embodiments, a product containing the heterogeneous ground calcium carbonate disclosed herein is free of dispersant, such as a polyacrylate. In another embodiment, a dispersant may be present in the product in a sufficient amount to prevent or effectively restrict flocculation or agglomeration of the ground calcium carbonate to a desired extent, according to normal processing requirements. The dispersant may be present, for example, in levels up to about 1% by weight. Examples of dispersants include, for example, polyelectrolytes such as polyacrylates and copolymers containing polyacrylate species, especially polyacrylate salts (e.g., sodium and aluminium optionally with a group II metal salt), sodium hexametaphosphates, non-ionic polyol, polyphosphoric acid, condensed sodium phosphate, non-ionic surfactants, alkanolamine, and other reagents commonly used for this function.

A dispersant may be selected from conventional dispersant materials commonly used in the processing and grinding of inorganic particulate materials, such as calcium carbonate. Such dispersants will be recognized by those skilled in this art. Dispersants are generally water-soluble salts capable of supplying anionic species, which in their effective amounts can adsorb on the surface of the inorganic particles and thereby inhibit aggregation of the particles. The unsolvated salts may suitably include alkali metal cations, such as sodium. Solvation may in some cases be assisted by making the aqueous suspension slightly alkaline. Examples of suitable dispersants also include water soluble condensed phosphates, for example, polymetaphosphate salts [general form of the sodium salts: $(NaPO_3)_x$], such as tetrasodium metaphosphate or so-called "sodium hexametaphosphate" (Graham's salt); water-soluble salts of polysilicic acids; polyelectrolytes; salts of homopolymers or copolymers of acrylic acid or methacrylic acid; and/or salts of polymers of other derivatives of acrylic acid, suitably having a weight average molecular mass of less than about 20,000. Sodium hexametaphosphate and sodium polyacrylate, the latter suitably having a weight average molecular mass in the range of about 1,500 to about 10,000, are preferred.

In certain embodiments, the production of the ground calcium carbonate includes using a grinding aid, such as propylene glycol, or any grinding aid known to those skilled in the art.

According to some embodiments, the heterogeneous ground calcium carbonate may be combined with coal dust. Without being bound to a particular theory, the heterogeneous ground calcium carbonate compositions disclosed may effectively render coal dust inert, as shown by an explosibility test.

What is claimed is:

1. A method for abating explosions in a mine containing coal dust, the method comprising:

providing in the mine containing coal dust a heterogeneous,
non-caking mine rock dust comprising
a fine, wet ground inorganic particulate material coated with at least one fatty acid, a salt thereof, or an ester thereof; and
a coarse, untreated, dry ground inorganic particulate material,
wherein particle packing of the fine, wet ground inorganic particulate material into voids between the coarse, untreated, dry ground inorganic particulate material reduces moisture wicking into the heterogeneous, non-caking mine rock dust, and
wherein the ratio by weight of fine, wet ground inorganic particulate material to coarse, untreated, dry ground inorganic particulate material ranges from about 5:95 to about 30:70, and
wherein, when in contact with water, the mine rock dust remains dispersable to render coal dust explosively inert.

2. The method of claim 1, wherein the fine, wet ground inorganic particulate material is ground calcium carbonate.

3. The method of claim 1, wherein the coarse, untreated, dry ground inorganic particulate material is calcium carbonate.

4. The method of claim 1, wherein the coarse, untreated, dry ground inorganic particulate material comprises at least one of gypsum, diatomaceous earth, perlite, hydrous or calcined kaolin, attapulgite, bentonite, and montmorillonite.

5. The method of claim 1, wherein the fine, wet ground inorganic particulate material has a $d_{50}$ ranging from about 0.5 to 75 microns.

6. The method of claim 1, wherein the coarse, untreated, dry ground inorganic particulate material has a $d_{50}$ ranging from about 3 to about 75 microns.

7. The method of claim 1, wherein the at least one fatty acid, salt thereof, or ester thereof comprises one or more fatty acids, salts thereof, or esters thereof with a chain length of C16 or greater.

8. The method of claim 1, wherein the fatty acid comprises stearic acid.

9. The method of claim 1, wherein the fatty acid, salt thereof, or ester thereof is present in an amount not greater than about 2.5% by weight of the fine, treated wet ground inorganic particulate material.

10. The method of claim 1, wherein the fine, wet ground inorganic particulate material is substantially free of dispersant.

11. The method of claim 1, wherein the fine, wet ground inorganic particulate material has a Hegman of about 5.5 or less.

12. The method of claim 1, wherein the fine, wet ground inorganic particulate material has a brightness of 95 or less.

13. The method of claim 1, wherein the fine, wet ground inorganic particulate material has a BET surface area of at least about 0.3 square meters/gram.

14. The method of claim 1, wherein the mine rock dust has a contact angle ranging from 10 to 150 degrees.

15. A heterogeneous composition comprising:
coal dust; and
non-caking mine rock dust comprising
a fine, wet ground inorganic particulate material coated with at least one fatty acid, a salt thereof, or an ester thereof; and
a coarse, untreated, dry ground inorganic particulate material, wherein particle packing of the fine, wet ground inorganic particulate material into voids between the coarse, untreated, dry ground inorganic particulate material reduces moisture wicking into the non-caking mine rock dust, wherein the ratio by weight of fine, wet ground inorganic particulate material to coarse, untreated, dry ground inorganic particulate material ranges from about 5:95 to about 30:70, and wherein the heterogenous composition is in contact with water, and wherein the amount of dispersible non-caking mine rock dust is sufficient to render the coal dust explosively inert.

16. The heterogeneous composition of claim 15, wherein the fine, wet ground inorganic particulate material has a $d_{50}$ ranging from about 0.5 to 75 microns.

17. The heterogeneous composition of claim 15, wherein the coarse, untreated, dry ground inorganic particulate material has a $d_{50}$ ranging from about 3 to about 75 microns.

18. The heterogeneous composition of claim 15, wherein the at least one fatty acid, salt thereof, or ester thereof comprises one or more fatty acids, salts thereof, or esters thereof with a chain length of C16 or greater.

19. The heterogeneous composition of claim 15, wherein the heterogeneous composition has a contact angle ranging from 25 to 125 degrees.

* * * * *